(12) United States Patent
Harper et al.

(10) Patent No.: US 8,056,368 B2
(45) Date of Patent: Nov. 15, 2011

(54) METHOD FOR TAPERING OPTICAL FIBERS TO CONFORM TO A DESIRED RADIAL PROFILE

(75) Inventors: Kevin Randolph Harper, Palm Bay, FL (US); Timothy Joseph Norwood, West Lafayette, IN (US); Timothy Eugene Dimmick, Oviedo, FL (US)

(73) Assignee: Harris Corporation, Melbourne, FL (US)

( * ) Notice: Subject to any disclaimer, the term of this patent is extended or adjusted under 35 U.S.C. 154(b) by 459 days.

(21) Appl. No.: 12/164,796

(22) Filed: Jun. 30, 2008

(65) Prior Publication Data
US 2009/0320527 A1 Dec. 31, 2009

(51) Int. Cl.
*C03B 37/07* (2006.01)

(52) U.S. Cl. ............... 65/435; 65/381; 65/486; 65/408; 65/411

(58) Field of Classification Search .................. 65/408, 65/410, 411, 381, 435, 486
See application file for complete search history.

(56) References Cited

U.S. PATENT DOCUMENTS

| 5,224,977 A | 7/1993 | Anjan et al. |
| 5,707,564 A * | 1/1998 | Rivoallan ..................... 264/1.24 |
| 5,931,983 A | 8/1999 | Bloom |
| 6,763,685 B1 * | 7/2004 | Gonthier ........................ 65/411 |
| 2006/0268956 A1 | 11/2006 | Dimmick et al. |

OTHER PUBLICATIONS

Kenny, R.P., Control of Optical Fiber Taper Shape, Aug. 29, 1991, Electronics Letters, vol. 27 No. 18, pp. 1654-1656.*

T.A. Birks & Y.W. Li, "The Shape of Fiber Tapers"; Journal of Lightwave Technology vol. 10 No. 4, pp. 432-438, Apr. 1992.
T.A. Birks, P.S. Russell & D.O. Culverhouse, "The Acousto-Optic Effect in Single-Mode Fiber Tapers and Couplers"; Journal of Lightwave Technology vol. 14 No. 11, pp. 2519-2529, Nov. 1996.
T.E. Dimmick, G. Kakarantzas, T.A. Birks & P.S. Russell; "Narrow-Bank Acousto-Optic Tunable Filter Fabricated From Highly Uniform Tapered Optical Fiber"; Opt. Soc. America, 2000.
C. Alegria, R. Feced, M.N. Zervas, R.I. Laming & S.G. Farwell; "Acousto-Optic Filters Based on Multi-Tapered Fibre Structures"; Electronics Letters vol. 35, No. 12, pp. 1006-1007, 1999.
Ming Cai, Per Olof Hedekvist, Ashish Bhardwaj, Kerry Vahala, "5-Gbit/s BER Performance on an all Fiber-Optic Add/Drop Device Based on a Taper-Resonator-Taper Structure," IEEE Photonics Technology Letters, vol. 12 Issue 9, Sep. 2000, pp. 11-77-1179.
T.J. Kippenberg, D.K. Armani, S.M. Spillane, K.J. Vahala, "Ultra-High-Q Toroid Microcavities on a Chip," Conference on Lasers and Electro-Optics, 2003 (CLEO 2003), Jun. 1-6, 2003, pp. 180-182.
T.A. Birks, J.C. Knight, T.E. Dimmick, "High-Resolution Measurement of the Fiber Diameter Variations Using Whispering Gallery Modes and No Optical Alignment," IEEE Photonics Technology Letters, vol. 12, Issue 2, Feb. 2000, pp. 182-183.

(Continued)

*Primary Examiner* — Queenie Dehghan
(74) *Attorney, Agent, or Firm* — GrayRobinson, PA (57) ABSTRACT

An apparatus and method for tapering an optical fiber segment having an initial radial profile to substantially conform to a pre-specifiable desired radial profile for controlling mutually coordinated elongation and softening of different axial portions of the segment according to control parameters derivable based on a normalized axial coordinate reference by which points of the initial profile map to corresponding points of the desired profile. The softening and/or elongation may progress substantially in either a step-wise, time-discrete manner or time-continuously. The invention is useful for forming tapered fused couplers as well as for tapering individual fibers.

17 Claims, 5 Drawing Sheets

OTHER PUBLICATIONS

T.A. Birks, R. Le Roux, G. Kakarantazas, J.C. Knight, "Whispering Gallery Modes in Prolate Fibre Microcavities," Conference on Lasers and Electro-Optics, (CLEO 2000), May 7-12, 2000, p. 608.

Data Sheet "Minibend Coupler," Alcoa AFL Telecommunications.

Pierre Lucas, David Le Coq, Christophe Juncker, Jayne Collier, Dianne E. Boesewetter, Catherine Boussard-Pledel, Bruno Bureau, Mark R. Riley, "Evaluation of Toxic Agent Effects on Lung Cells by Fiber Evanescent Wave Spectroscopy," Applied Spectroscopy, vol. 59, No. 1, Jan. 2005, pp. 1-9.

S. Hocde, O. Loreal O. Sire, B. Turlin, C. Boussard-Pledel, D. Le Coq, B. Bureau, G. Fonteneau, C. Pigeon, P. Leroyer, J. Lucas, "Biolgocal Tissues Infrared Analysis by Chalcogenide Glass Optical Fiber Spectroscopy," Proceedings of SPIE—The International Society for Optical Engineering, vol. 4158, 2001, pp. 49-56.

Nikolay A. Denisov, Sergiy M. Dets, Igor V. Kravchenko, "Tapered Fiber Optics Sensors for Laser Medicine," Proceedings of SPIE—The International Society for Optical Engineering, vol. 2928, 1996, pp. 165-174.

Joel Villatoro, Antonio Diez, Jose L. Cruz, Miguel V. Andres, "In-Line Highly Sensitive Hydrogen Sensor Based on Palladium-Coated Single-Mode Tapered Fibers," IEEE Sensors Journal, vol. 3, No. 4, Aug. 2003, pp. 533-537.

Peter B. Tarsa, Diane M. Brzozowski, Paul Rabinowitz, Kevin Lehmann, "Cavity Ringdown Strain Gauge," Dept. of Chemistry, Princeton University; Optics Letters, vol. 29, No. 12, Jun. 15, 2004, pp. 1339-1341.

A. Martin, R. Badcock, C. Nightingale, G.F. Fernando, "A Novel Optical Fiber-Based Strain Sensor," IEEE Photonics Technology Letters, vol. 9, No. 7, Jul. 1997, pp. 982-984.

Gang He, Marke T. Wlodarczyk, Emery L. Moore, "Tapered Fiber-Based Diaphragm-Type Pressure Sensor," Optrand Inc., Ann Arbor, MI; Proceedings of SPIE—The International Society for Optical Engineering, vol. 2070, 1994, pp. 39-46.

Joel Villatoro, David Monzon-Hernandez, Donato Luna-Moreno, "In-Line Optical Fiber Sensors Based on Cladded Multimode Tapered Fibers," Applied Optics, vol. 43, No. 32, Nov. 10, 2004, pp. 5933-5938.

M. Cai, O. Painter, K.J. Vahala, "Fiber-Coupled Microsphere Laser," Department of Applied Physics, California Institute of Technology; Optics Letters, vol. 25, No. 19, Oct. 1, 2000, pp. 1430-1432.

G.J. Pendock, H.S. Mackenzie, F.P. Payne, "Dye Lasers Using Tapered Optical Fibers," Applied Optics, vol. 32, No. 27, Sep. 20, 1993, pp. 5236-5242.

Mark A. Foster, Alexander L. Gaeta, "Ultra-Low Threshold Supercontinuum Generation in Sub-Wavelength Waveguides," Sch. of Appl. and Eng. Physics, Cornell University, Optics Express, vol. 12, No. 14, Jul. 2004, pp. 3137-3143.

T.A. Birks, R.P. Kenny, K.P. Oakley, C.V. Cryan, "Elimination of Water Peak in Optical Fibre Taper Components," Electronics Letters, vol. 26, No. 21, Oct. 11, 1990, pp. 1761-1762.

Limin Tong, Rafael R. Gattass, Jonathan B. Ashcom, Sailing He, Jingyi Lou, Mengyan Shen, Iva Maxwell, Eric Mazur, "Subwavelength-Diameter Silica Wires for Low-Loss Optical Wave Guiding," Nature, 426, 2003, pp. 816-819.

Gilberto Brambilla, Vittoria Finazzi, David Richardson, "Ultra-Low-Loss Optical Fiber Nanotapers," Optics Express, vol. 12, No. 10, May 17, 2004, pp. 2258-2263.

P. Datta, I. Matias, C. Aramburu, A. Bakas, M. Lopez-Amo, J.M. Oton, "Tapered Optical-Fiber Temperature Sensor," Microwave and Optical Technology Letters, vol. 11, No. 2, Feb. 5, 1996, pp. 93-95.

T.P.M. Man, T.A. Birks, "Brodband Optical Fibre Switch," Royal Society Summer Studentship Report, University of Bath, 1997 (unpublished).

C.D. Singh, Yutaka Shibata, Masami Ogita, "A Theoretical Study of Tapered, Porous Clad Optical Fibers for Detection of Gases," Sensors and Actuators, B: Chemical, vol. 92, No. 1-2, Jul. 1, 2003, pp. 44-48.

\* cited by examiner

METHOD FOR TAPERING OPTICAL FIBERS TO CONFORM TO A DESIRED RADIAL PROFILE

CROSS-REFERENCE TO RELATED APPLICATIONS

Not Applicable.

STATEMENT REGARDING FEDERALLY SPONSORED-RESEARCH OR DEVELOPMENT

Not Applicable.

INCORPORATION BY REFERENCE OF MATERIAL SUBMITTED ON A COMPACT DISC

Not Applicable.

FIELD OF THE INVENTION

The invention relates to the tapering of optical fibers. More particularly, the invention relates to an apparatus and method of tapering single or fused optical fibers from ones having some initial radial profile into ones which predictably and repeatably substantially conform to a pre-specifiable, desired radial profile of substantially constant or non-constant diameter, desired axial length, and virtually arbitrarily complex shape.

BACKGROUND OF THE INVENTION

Optical fibers serve as waveguides for optical energy and are useful for many applications. Being capable of transmitting signals at light speed, highly immune to noise and crosstalk, offering low loss, high bandwidth, and excellent electrical isolation, optical fibers frequently serve as signal transmission lines. Beyond serving basic transmission line functions, optical fibers can be specially formed in ways enabling them to serve more sophisticated functions. For example, special functions can be carried out by devices made by tapering one or more segments of a single or fused fiber.

Through tapering, single and/or fused optical fibers can be adapted to applications for which untapered fibers are unsuitable. Tapered fibers have been designed to serve as spectral filters, frequency shifters, switches, variable couplers, tunable and nontunable filters, resonators and more. A number of such devices have been described for example by T. A. Birks, P. S. Russell and D. O. Culverhouse, in "The Acousto-Optical Effect In Single Mode Fiber Tapers and Couplers", Journal of Light Wave Technology, volume 14, number 11 pages 2519-2529, November 1996. Tapered optical fiber devices find application for example in the computer, telecommunications, aeronautics, and television broadcasting industries.

In an untapered optical fiber, the optical field is generally confined to a small region in the center of the fiber where it is guided by a central region referred to as the core. The core is encased in a surrounding material called cladding. The core has a somewhat higher index of refraction than the surrounding cladding. Currently, most fibers used for telecommunications applications are designed to support only a single guided mode. Tapering a single mode fiber causes the light to transition from the mode in the core of the untapered fiber to the lowest order mode of the taper waist. If tapering is sufficiently gradual, this transition can take place with very low optical loss. The optical energy in the tapered region is then guided by the boundary between the cladding and the material surrounding the cladding, often air. Tapering also allows access to the evanescent tail of the optical mode field as it extends out of the taper waist into the surrounding material. Two or more fibers may also be fused to form couplers or devices for performing other functions achieved through interaction of signals carried by more than one fiber.

The term "radial profile" (or equivalently "diametrical profile" due to fiber cross-sectional symmetry), refers to the shape according to the radius (or diameter) of a segment of a fiber that changes with distance over its length along the longitudinal axis of the segment. The shape and length of the radial profile are highly determinative of the characteristics and performance of tapered fiber optical devices. Radial profile has a crucial bearing on important properties of a fiber, including such properties as bend tolerance, number of modes supported and the effective index of refraction of the guided modes.

Devices have been demonstrated that rely on access to the evanescent field facilitated by fiber tapering. These include micro ring resonator filters fabricated from micro spheres, micro toroids and tapered fiber cylinders. Devices such as tunable phase shifters and attenuators are also possible by immersing the tapered fiber in a material with controllable refractive index or absorption.

Another class of devices that may be implemented with tapered optical fiber takes advantage of mode coupling between the multiple modes that may be supported by the taper waist. Optical notch filters may be fabricated by employing a periodic perturbation to the taper waist with a period chosen to match the beat length between modes at a particular resonant wavelength. One method of producing such a notch filter is to employ an ultrasonic transducer to launch an acoustic flexural wave into the taper waist. Filters of this type have been demonstrated that are electrically tunable in both resonant wavelength and notch depth. These acousto-optic filters take advantage of coupling between forward propagating modes in the coupler waist because the beat length between these modes is relatively long. It is also possible to produce devices that couple between forward and backward propagating modes in the taper waist. The beat length between these modes is on the order of one half of the optical wavelength. Perturbations with such short periods may be implemented in the material surrounding the fiber taper.

Yet another class of devices that may be implemented with tapered optical fiber takes advantage of the strong index guide that is created by the large index of refraction step between the tapered fiber and the surrounding air. Because of this large step in index, tight bends may be achieved with relatively low optical loss. Optical "turnarounds" have been commercialized that rely on this property to redirect light one hundred eighty degrees (180°) in very small packages.

Because the evanescent fields in a taper waist extend into the surrounding medium, tapered fibers also find application as sensing devices. Tapered optical fiber-based devices have been applied to biological sensing and chemical sensing. Tapered optical fibers have also been used as a key component in highly sensitive strain and pressure sensors, temperature sensors, and refractive index sensors.

Tapered optical fibers are also useful in laser applications. Tapered fibers are important for coupling from micro resonator lasers, and have been demonstrated as a platform for dye lasers.

A common requirement of many of the aforementioned devices and device applications is that the dimensions of the tapered fiber be tightly controlled. The effective index of the optical modes supported in the taper waist varies with the taper waist diameter. Thus, many device applications have strict requirements on radial profile shape and uniformity. In addition, the radial profile of tapered segments of optical fiber most often must be smoothly varying with axial length in order to minimize optical loss resulting from transitions in radial dimension.

Tapering involves drawing a segment of the fiber, or pair of fused fibers, into an elongated, reduced diameter portion, sometimes called a "waist". A common method of fabricating tapered and fused fiber devices involves heating a fiber with a small, axially movable, flame to soften them sufficiently that one or both ends of the fiber can be pulled axially to draw the fiber into a taper. An example of such technique and an apparatus for carrying it out have been described by T. A. Birks and Y. W. Li, "The Shape of Fiber Tapers," Journal of light wave technology, volume 10, no. 4 pp 432-438, April, 1992. That technique can also be used to concurrently taper and fuse to one another a pair of adjoining fibers.

Another method and apparatus for fabricating a fiber optic fused coupler is described for example in U.S. Pat. No. 5,931,983 to Bloom. According to that patent, a pair of adjoining optical fibers is heated and softened by means of a heat source located a predetermined distance from the fibers. The degree of coupling between the fibers is monitored by a laser device. Once a portion is softened, the unsoftened ends of the fiber are pulled apart axially at an initial pulling velocity. The heat source is moved away from the fibers and the pulling velocity selectively reduced in response to a substantial change in coupling ratio as detected by the laser device.

However, the capabilities of prior art fabrication methods and equipment have been limited in at least two significant respects. The complexity of the shapes of radial profiles which can be formed with suitable dimensional accuracy and repeatability has been very limited. In the prior art, only radial profiles of relatively simple shape could be formed reliably. For example, prior art methods and apparatus have been capable of forming axially symmetrical "hourglass" shaped tapers with mutually opposing transition portions whose diameters decrease monotonically and meet a thinned waist of substantially uniform diameter. Relatively simple radial profiles of substantially linearly or exponentially decreasing shape, or radial profiles controlled principally as to overall length and having a waist of nominally constant radius also have been obtained by linearly varying the length of the hot zone as elongation of the fiber proceeds such as by sweeping the heat source in an oscillatory manner as described by T. A. Birks and Y. W. Li, infra.

Prior art optical fiber tapering methods and apparatus have also been limited as to their ability to create optical fibers having desired radial profiles that: (i) can readily be specified in advance in an unambiguous way; (ii) suitably conform in both shape and dimension to the desired radial profile; (iii) are capable of exhibiting smooth axial transitions in radius; (iv) are readily reproducible with high repeatability, and can have shapes more complex than those which have been produceable heretofore.

Improving the performance of optical devices and systems will require the ability to fabricate tapered optical fibers with radial profiles that can be formed more predictably and with greater control over shape and dimensional accuracy than has been possible in the prior art. The development of new kinds of optical devices, capable of performing functions not previously possible, will demand the ability to fabricate tapered optical fibers having radial profiles of more complex shapes than those which can be realized using prior art tapering methods and apparatus.

SUMMARY OF THE INVENTION

The invention provides an apparatus and method for tapering a segment of an optical fiber from one having a given initial radial profile into one which substantially conforms to a desired radial profile having a substantially arbitrary, and pre-specifiable shape. The method of the invention can be carried out, and the desired radial profile can be formed, with a tapering apparatus controlled in accordance with parameters derivable by mapping points of the initial profile with corresponding points of the desired radial profile on a normalized axial coordinate reference. The normalized axial coordinate reference provides a basis for determining the parameters needed for executing mutually coordinated elongation and softening of different portions of the fiber segment until the shape of the segment substantially conforms to the desired radial profile. Those parameters are readily derivable directly from the shapes of the initial radial profile and the desired radial profile, both of which are known in advance.

The method of the invention can be carried out, and the apparatus of the invention implemented, such that mutually coordinated movements for softening and elongating different axial portions of the fiber segment are executed to progress successively from one such axial position to another in a substantially time-continuous manner. According to alternative embodiments, either softening and/or elongation progress from one axial position to another in a substantially step-wise, time-discrete manner.

According to yet another aspect of the invention, the transformation from initial radial profile is carried out iteratively by forming one or more intermediate radial profiles, each of which conforms successively more closely to the ultimate desired radial profile According to a further aspect of the invention, tapered fused optical fibers can be formed by a tapering method and apparatus as otherwise described above but wherein the aforementioned parameters are determined by characterizing the initial radial profile and the desired radial profile, as each having a respective effective radius and degree of fusion.

Subject to the constraints that the fiber segment remains of constant internal volume; has a radial profile which remains axially symmetrical during tapering and does not increase in radius at any given axial position as tapering is carried out, and that the segment increases in axial length during tapering, the invention permits tapering an optical fiber segment into one having a pre-specified desired radial profile of relatively simple or complex shape. The invention affords levels of shape flexibility, dimensional accuracy, predictability and repeatability not achievable in the prior art.

DESCRIPTION OF A PREFERRED EMBODIMENT

Figure 1:
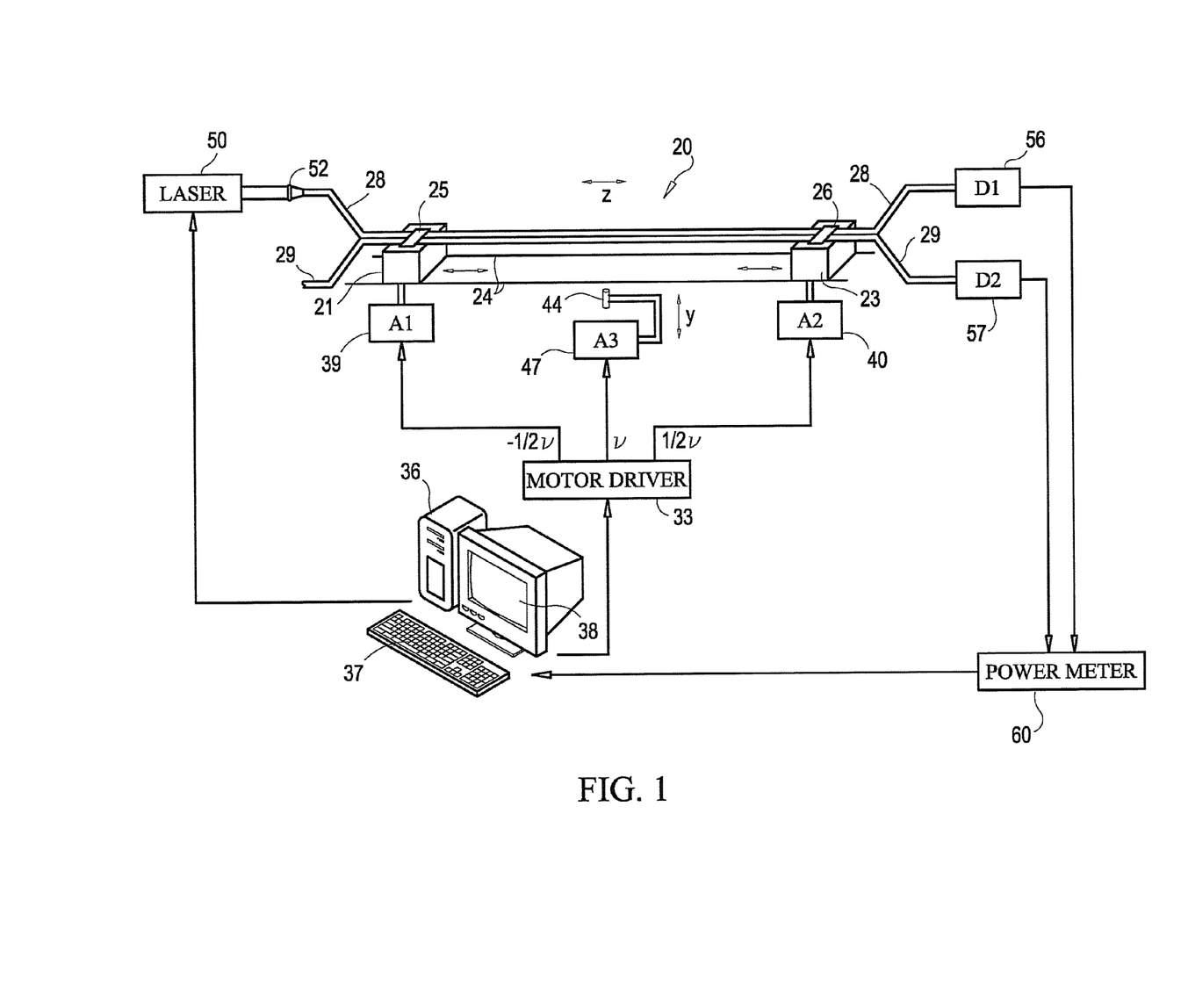
FIG. 1 is a schematic diagram illustrating a preferred embodiment of the apparatus of the invention.

Referring to FIG. 1, a preferred embodiment of an apparatus 20 according to the present invention will now be described. Apparatus 20 includes a pair of stages 21 and 23. Each stage 21 and 23 is mounted, such as on a track or other linear guideway 24, for bidirectional linear movement parallel to a linear axis, z. Stages 21 and 23 are each provided with a respective holding device 25 and 26 for affixing mutually spaced portions of one or more optical fibers 28 and 29 to movable stages 21 and 23 such that the longitudinal axis of the optical fibers are oriented parallel to the z axis. A pair of optical fibers 28 and 29 are shown in FIG. 1, as an example showing apparatus 20 as used to foam a coupler or other fused fiber device, it will be appreciated that only a single optical fiber 28 or 29, would be present when tapering only a single fiber. As used herein "axially" or "axial" refer to the longitudinal axes of fiber(s) 28 and/or 29 and lies parallel to the z axis.

Holding devices 25 and 26, may be any suitable device for holding optical fibers 28 and 29 in positionally fixed relation to stages 21 and 23, and may suitably comprise vacuum chucks. A motor driver 33 operably coupled to a programmable controller 36 is connected to a pair of actuators 39 and 40. Actuators 39 and 40 mechanically coupled to stages 21 and 23, respectively. Actuators 39 and 40 operate to move stages 21 and 23 axially under the control of controller 36. Actuators 39, 40 may suitably comprise electromechanical devices such as stepper motors, or any other types of devices capable of carrying out accurate axial translation of stages 21 and 23 such that both the relative axial position and the relative axial speed of stages 21 and 23 can be independently and variably controlled according to control signals generated by controller 36 based on control parameters defined in accordance with the invention as will be described further below.

Controller 36 preferably comprises a programmable controller which includes a keyboard, a reader for reading computer-readable storage media, or other input facility 37, for entering program instructions and information such as data describing the initial radial profile and the desired radial profile of the segment to be tapered and/or the control parameters referred to above. It will be appreciated that some or all of such information and/or program instructions can be pre-stored in memory or firmware associated with controller 36, or can be stored separately on computer-readable media capable of being read by controller 36. Controller 36 also preferably includes a visual display device to monitor the tapering process and/or the state various components of apparatus 20 as well as to aid in the input of information and/or program instructions by way of keyboard 37. Controller 36 can, but need not, be adapted to carrying out data processing operations for actually determining the pertinent control parameters from the initial radial profile and the final radial profile. Such control parameters could be derived externally and entered into controller 36.

Apparatus 20 includes a softening device 44 for softening an axial portion of fibers 28 and/or 29. The softening device 44 is adapted to soften a relatively small, localized axial portion of the particular segment the optical fiber or fibers 28 and/or 29 to a suitably softened state to permit axial elongation of the segment or at least an axial portion of the segment, without fracture, melting or significant sagging. A particular portion of the segment which is in such softened state at a given point in time is referred to herein as the "softened portion". The softening device 44 may suitably be implemented as a heat source, such as a flame burner capable of applying a finely controllable amount of heat to one aforementioned small axial portion of optical fibers 28 and/or 29 at any given time. Other types of heat sources, such as a laser, electric heater, heated crucible or any other device capable of rapidly forming an axially localized softened portion may also be used as a softening device 44. As used herein, the term "axial position" of the softened portion refers to the instantaneous axial location about which the softened portion is substantially centered.

The softening device 44 is mounted as to be capable of bidirectional axial movement relative to fibers 28, 29. By axially repositioning the flame burner or other softening device 44 relative to the segment being tapered, a softened portion can be made to exist at different axial positions within the segment at different times as the tapering proceeds. To effect such axial movement, apparatus 20 includes an actuator 47. Actuator 47 may suitably comprise an electromechanical device, such as a stepper motor, or any other type of device capable of carrying out axial translation of softening device 44 such that both its instantaneous axial speed and its instantaneous axial position relative to fiber(s) 28 and/or 29 can be independently and variably controlled via control signals generated by controller 36 representing control parameters defined in accordance with the invention as will be described in further detail below. In the preferred embodiment, there is typically no significant lag between the axial speed and position of the softening device 44 and those of the softened portion itself. As a result, the instantaneous axial position of the softened portion and its instantaneous axial speed directly track those of softening device 44. As used herein, the term "repositioning speed" is used to refer to the time rate of change of the axial position of the softened portion at any given time.

As a desirable option, particularly in embodiments in which softening device 44 comprises a flame burner or other direct heating source, control over parameters, in addition to axial position and repositioning speed, can also be employed. For example, control of a flame burner in order to provide the most stable heating of the fiber may, can be carried out as described in U.S. Patent Publication Number US 2006/0268956 A1, to T. Dimmick and K. Harper, published Nov. 30, 2006. That publication is expressly incorporated herein by reference in its entirety to form part of the present disclosure. It is to be understood however, that controlling any other parameters associated with softening device 44, other than those determinative of the axial position of the softened portion and the repositioning speed is optional and is not required in order to practice the present invention.

As a further option, apparatus 20 may also include a laser 50 optically coupled to one of the optical fibers 28 by way of a coupling element 52, such as a lens. The opposed ends of one or both of fibers 28 and 29 are coupled to a respective one of a pair of detectors 56 and 57 which communicate with programmable controller 36 by way of a power meter 60. When forming a fused optical device, programmable controller 36 can optionally process signals received from power meter 30 in order to determine the degree of optical coupling between fibers 28 and 29 and monitor the fabrication process accordingly. Laser 50, power meter 60 and detector 56 can also optionally be used to measure the optical loss of a fiber 28 substantially in real-time during the tapering process.

Apparatus 20 is constructed to allow controller 36 to exercise independent and variable control over both the axial position and axial speed of each stage 21, 23 so as to be able to control both the rate and amount of elongation of optical fibers 28, 29. As used herein, the term "elongation distance" refers to the instantaneous relative axial spacing present between the opposite ends of a softened portion of the segment being tapered. In the preferred embodiment, elongation distance is correlated to, and may be determined directly from, the instantaneous relative axial spacing between stages 21 and 23 as determined by programmable controller 36. Correspondingly, the term "elongation rate" is used herein to refer to the instantaneous time rate of change of the elongation distance. In the preferred embodiment, elongation rate is correlated to, and can be determined directly from, the instantaneous relative axial speed between stages 21 and 23 as determined by programmable controller 36.

Programmable controller 36 is programmed for controlling actuators 39 and 40 so as to enable controller 36 to exercise independent and variable control over both elongation distance and elongation rate. Elongation distance can be controlled for example such that the axial positions of stages 21 and 23 can change in an equal, but directionally opposite, manner such that the movement of each stage 21, 23 mirrors that of the other symmetrically about a particular axial location along the Z axis as observed from a fixed observation point external to both apparatus 20 and fibers 28, 29. Elongation rate can also be controlled so that the axial speed of one stage 21, 23 mirrors that of the other stage symmetrically about a particular axial location from such an observation point. Such mode of elongation control is not essential however.

According to alternative embodiments, programmable controller 36 can instead be programmed to execute the method of the invention according to any mode of control capable of independently varying the relative axial positions and relative axial speeds of stages 21 and 23 with respect to an observation point which moves with respect to an external observation point, but is stationary with respect to one or the other of stages 21 or 23.

Apparatus 20 can be implemented such that one or all of actuators 39, 40, and 47 are controlled such that one or more of elongation distance, elongation rate, axial position of the softened portion and/or repositioning speed can be varied in a substantially step-wise, time discrete manner, that is such that changes in their respective values are executed in one or more discrete increments at mutually-spaced time intervals. Alternatively, apparatus 20 can be implemented such that the value of any or all of those parameters can change value in a substantially time-continuous manner.

A preferred embodiment of the apparatus can be implemented by programming or otherwise adapting an otherwise conventional optical fiber tapering machine, such as a Model CW 200B made by Lightel Technologies, Inc. of Seattle, Wash., to carry out tapering in accordance with the method of the invention.

Preferred embodiments of the method of the invention, together with further details of the apparatus of the invention and its operation, will now be described.

Figure 2:
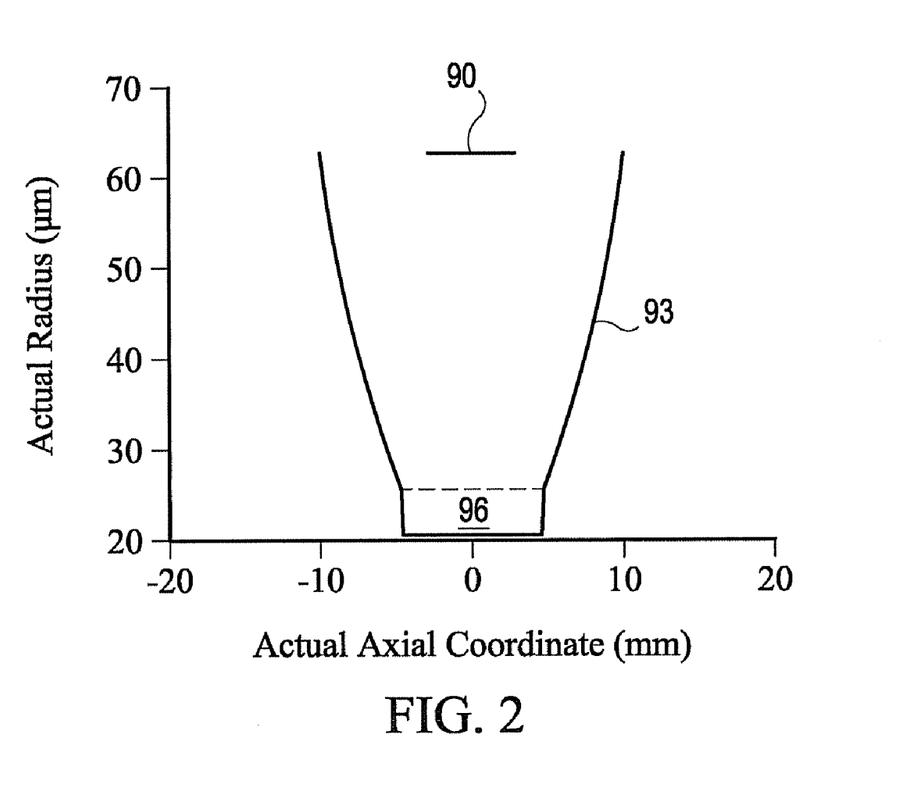
FIG. 2 is a graph showing an illustrative example showing a given initial radial profile of an optical fiber segment to be tapered and an arbitrarily specified desired radial profile to which it is sought to conform the shape of the segment after tapering according to the invention.

As shown in FIG. 2, an arbitrarily-shaped initial radial profile 90 of a segment of a fiber 28 of 29 to be tapered is known before tapering commences and extends over an initial axial domain, $z_i$. The pre-specified desired radial profile 93 into which the segment is ultimately to be formed is also known a priori. Desired profile 93 has a length spanning a certain domain, $z_f$. Since the segment remains radially symmetrical about its longitudinal axis (i.e., about its longitudinal axis located at zero radius) it is unnecessary to show its entire radial cross section in FIG. 2. In a preferred embodiment, representations of the initial radial profile 90 and the desired radial profile 93 are entered into programmable controller 36 such as by way of a keyboard or other input facility 37. In order to do so, the initial and desired radial profiles 90, 93 can be expressed mathematically as functions of radius versus axial position, or as equivalent sets of discrete data points representing such functions, or in any other suitable way.

In the particular example illustrated in FIG. 2, the initial radial profile 90 happens to define a cylinder having a constant radius of 62.5 μm and an overall length of about 5.6 mm which extends over initial domain, $z_i$, whose endpoints ($z_{i1}$, $z_{i2}$) are (−2.80 mm, +2.80 mm). The desired radial profile 93 in this example happens to be shaped as indicated and includes a central cylindrical waist portion 96 of uniform diameter. In the example shown in FIG. 2, the overall length of the desired radial profile 93 is 20.2 mm spanning a final domain, $z_f$, whose endpoints ($z_{f1}$, $z_{f2}$) are (−10.1 mm, 10.1 mm). Because tapering requires elongation, $z_i$ is always shorter than $z_f$. It is to be understood that the shapes and dimensions of the particular radial profiles just mentioned are merely arbitrary examples. These particular examples are provided solely by way of illustration and do not limit the scope of the invention. These examples should also not be construed to imply that the utility of the invention is limited to any particular initial radial profile or desired radial profile.

The invention provides a method and apparatus for tapering based on control parameters namely, axial position of the softened portion, repositioning speed, elongation distance and elongation rate, which are definable with reference to an axial coordinate reference which is "normalized" such that the domains of $z_i$ and $z_f$ are identical. The normalized axial reference allows individual points on or within the segment as defined by the initial radial profile 90 to be mapped to corresponding individual points on or within the segment in the form of desired radial profile 93. The normalized axial reference thus serves as a conceptual expedient which relates the location of any given point mass of the segment in the form of its initial radial profile 90 directly to its particular corresponding location upon the segment assuming the desired radial profile 93 and vice versa. Through such a "normalized" axial coordinate reference, the segment according to both its initial radial profile and its final radial profile are relatable to one another directly and predictably in completely unambiguous and mathematically general terms notwithstanding the fact that the length and shape of a fiber segment can change significantly in the course of being tapered. One manner in which such a normalized axial coordinate reference can be established will now be explained in further detail.

A fiber segment which undergoes tapering according to the invention changes shape but neither gains nor loses significant mass. The total volume of material present within the boundaries of segment when in the shape of its initial radial profile 90 equates to the total volume of material in the segment in its desired radial profile 93. In mathematical terms, this isovolumetric relationship can be expressed as follows:

$$\int_{z_{i1}}^{z_{i2}} r_i^2(z_i)\,dz_i = \int_{z_{f1}}^{z_{f2}} r_f^2(z_f)\,dz_f \qquad \text{Equation 1}$$

Where:
$z_i \in [z_{i1}, z_{i2}]$ is the actual axial domain over which the initial radial profile 90, $r_i(z_i)$, is defined;
$z_f \in [z_{f1}, z_{f2}]$ is the actual axial domain over which the desired radial profile 93, $r_f(z_f)$, is defined;
$z_{i1}$ and $z_{i2}$ are respectively, a lower limit of integration, and an upper limit of integration which represent the axial endpoints of the initial radial profile; and
$z_{f1}$ and $z_{f2}$ are respectively, a lower limit of integration, and an upper limit of integration which represent the axial endpoints of the desired radial profile.

Since the method of the invention entails elongating the fiber segment, the radius of the segment does not increase as it is transformed from its initial radial profile 90 into its desired radial profile 93. The radius of the segment according to its desired radial profile 93 will typically be smaller than at axially corresponding points of the initial radial profile 90.

Figure 3:
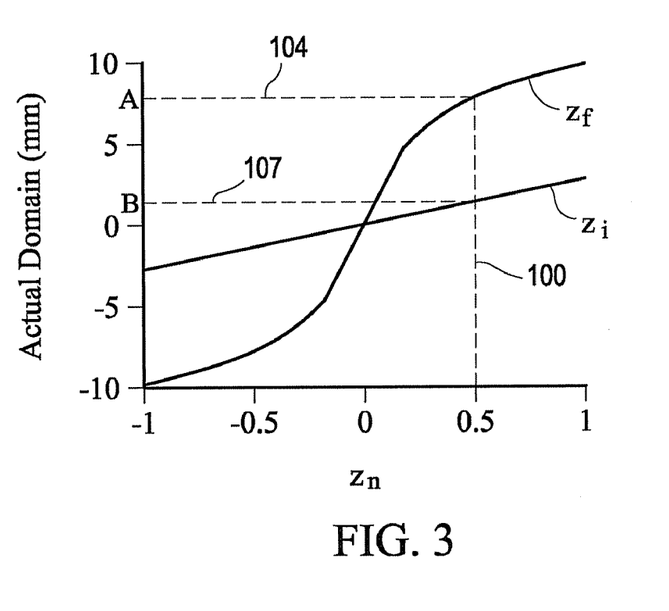
FIG. 3 is a graph illustrating a normalized axial coordinate reference which maps points of the initial radial profile of FIG. 2 to uniquely corresponding points of the desired radial profile of FIG. 2.

A normalized axial coordinate reference is illustrated in FIG. 3. Recognizing the dimensional symmetry which results from elongating a small softened portion of the fiber segment, the normalized axial coordinate reference is defined such that $z_i$ and $z_f$ are both centered about the origin (zero) of the normalized axial coordinate reference.

$$z_{i1} = -z_{i2} \text{ and } z_{f1} = -z_{f2}$$

In order to directly and unambiguously relate each point in the initial radial profile 90, to a uniquely corresponding point in the desired radial profile 93, the domains $z_i$ and $z_f$ over which their respective radii $r_i$ and $r_f$ are defined are both conformed to the domain, $z_n$, of the normalized axial coordinate reference. The domain $z_n$ is defined as extending over an axial interval of $[-1,1]$. Although the domain, $z_i$, of the initial radial profile 90 and the domain, $z_f$, of the desired radial profile differ from one another when expressed in actual dimensions, each can be mapped to the normalized axial coordinate reference so that, in normalized terms, the domains of both profiles 90, 93 cover the interval from $[-1,1]$ as shown in FIG. 3.

The actual domain, $z_i$, of the initial radial profile can be related to a normalized domain $z_n$, by an equation of the following form:

$$z_n = \frac{z_i}{z_{i2}} \qquad \text{Equation 2}$$

In accordance with the invention, the mapping of $z_f$, the actual domain of the desired radial profile, into normalized domain $z_n$ is determinable by imposing the constraint that the volume of the segment before tapering, that is, the volume of the segment according to its initial radial profile, remains substantially unchanged, at all times during and through completion, of the tapering process. Integral Equation 3 is based on the isovolumetric relationship of Equation 1, where $z_n$ and $z_f$ serve as the upper limits of integration. Equation 3 permits each axial coordinate within the domain, $z_f$, of the desired radial profile to be mapped to a unique corresponding normalized axial coordinate in a normalized domain, $z_n$.

$$\int_{-1}^{z_n} r_i^2(z_n')\,dz_n' = \int_{z_{f1}}^{z_f} r_f^2(z_f')\,dz_f' \qquad \text{Equation 3}$$

Equation 3 can be evaluated numerically using conventional numerical methods or in any other suitable way. A normalized axial coordinate reference established based on Equations 2 and 3 for the particular radial profiles shown in FIG. 2 is illustrated in FIG. 3. As indicated by broken lines 100, 104 and 107 in FIG. 3, the normalized axial coordinate reference maps every axial point with the domain, $z_i$, of the initial radial profile 90, and every axial point within the domain $z_f$ of the desired radial profile 93 to a unique corresponding normalized axial location in $z_n$ such that there is a one-to-one (1:1) correspondence between inside the volume of the segment before tapering commences, over the entire domain, $z_i$, of its initial radial profile, and every point within $z_f$ in terms of their respective actual domains ($z_i$ and $z_f$ as well as with respect to the normalized domain, $z_n$.

As FIG. 3 shows, a point at normalized axial location coordinate 0.5 in this particular example corresponds to an actual axial coordinate positioned at "B" millimeters in the actual domain $z_i$ of initial radial profile 90 and also corresponds uniquely to an axial point positioned at "A" millimeters in the actual domain $z_f$ of desired radial profile 93. With the correspondence between $z_i$ and $z_f$ thus being established through the normalized axial coordinate reference, the aforementioned parameters for controlling the tapering apparatus of the invention and carrying out the tapering method of the invention are determinable as will be described further below with reference to Equations 10, 11 and 13 further below. Before discussing those Equations, it is to be noted that from Equation 3 a normalized axial coordinate reference, such as that illustrated in FIG. 3, allows points of initial radial profile 90 to be mapped to unique corresponding points of the desired radial profile 93, both axially and radially.

Figure 4:
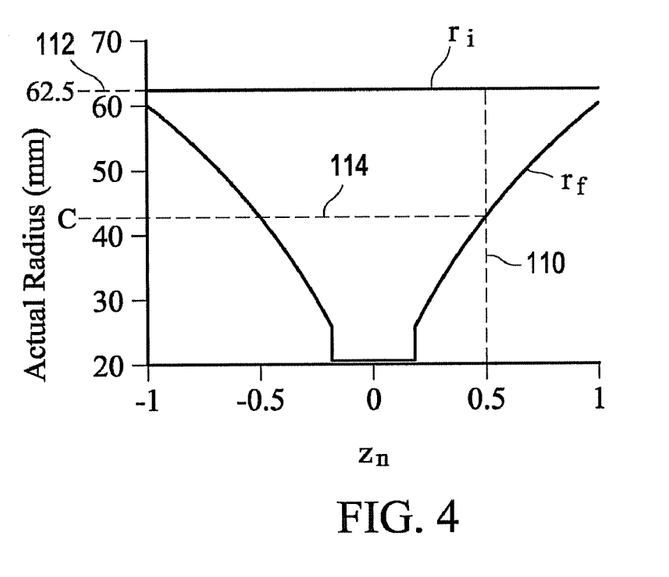
FIG. 4 is a graph of the radii of the initial radial profile of FIG. 2 and the desired radial profile of FIG. 2 versus position in normalized axial coordinates.

As illustrated in FIG. 4, by solving for radius, Equations 2 and 3 can also map each radial point, $r_i$, of initial radial profile 90 to a uniquely corresponding radial point, $r_f$, of the desired radial profile 93. For the example radial profiles 90, 93 shown in FIG. 4, broken lines 110, 112 and 114 show that the normalized axial coordinate reference has a domain, $z_n$, which maps the radius, $r_i$, of the initial radial profile 90 to the radius, $r_f$, of the desired radial profile 93 for every given normalized axial location in $z_n$. In the example of FIG. 4, this mapping is such that normalized axial location coordinate 0.5, uniquely corresponds to an actual $r_i$ of 62.5 μm, and also uniquely corresponds to the particular actual $r_f$ value indicated at as "C" μm.

Having explained above how every point in the initial radial profile and every point in the desired radial profile can be related directly to one another on a one-to-one basis, a preferred manner in which such relationship can be used to establish control parameter values suitable for carrying out the invention will now be explained with reference to FIG. 5.

A small cylindrical element of a fiber segment according to an initial radial profile can be conceptualized as being located at an initial axial position coordinate $z_i$ and having a volume $dV_i$ at some initial time $t_0$. A corresponding cylindrical element segment of the fiber segment according to its desired radial profile located at a final axial position coordinate $z_f$ has an equal volume $dV_f$ at a time $t_0+dt$.

Volume elements $dV_i$ and $dV_f$ can be related to each other by:

$$dV_i = \pi r_i^2(z_n)dl_i = \pi r_f^2(z_n)dl_f = dV_f \qquad \text{Equation 4}$$

where $dl_i$ and $dl_f$ represent small axial lengths of the initial and desired final cylindrical elements respectively.

An axial elongation distance, dx, can be represented as the difference between the lengths of the two cylindrical elements:

$$dx = dl_f - dl_i \qquad \text{Equation 5}$$

Figure 5:
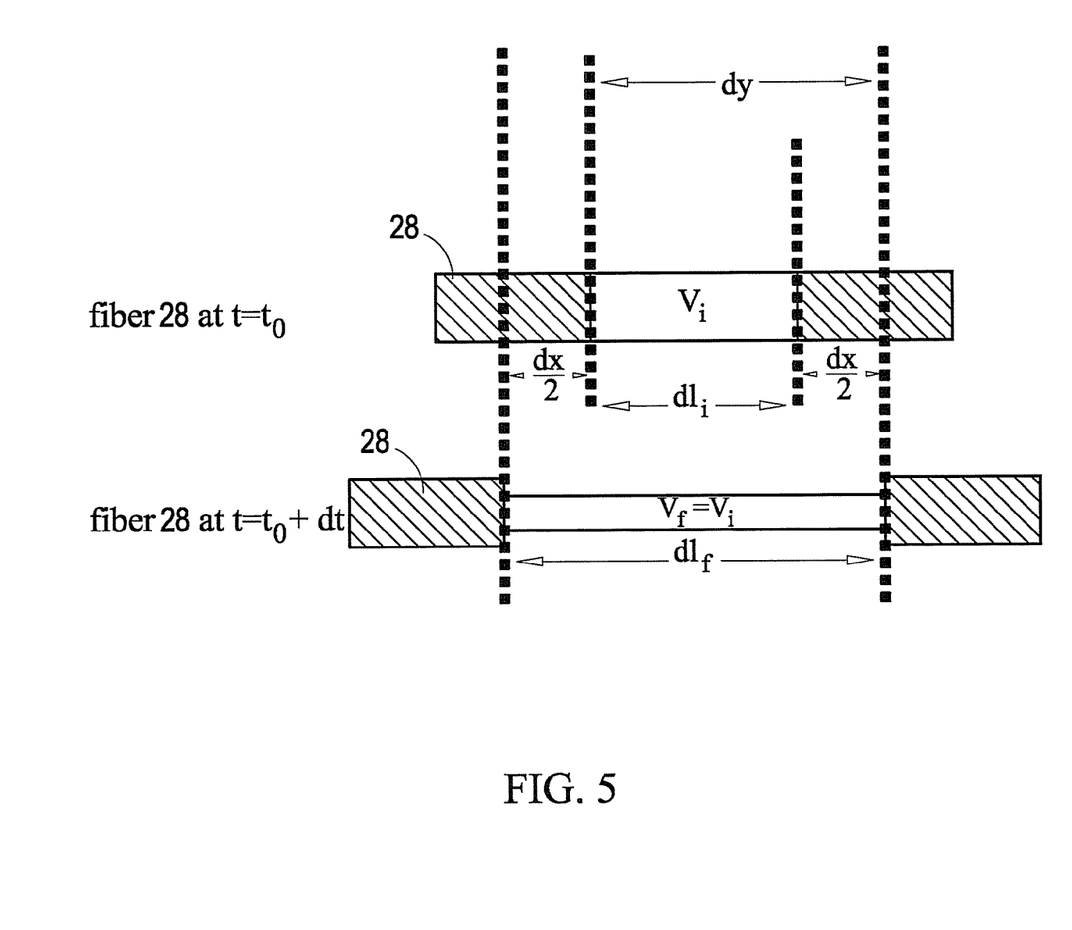
FIG. 5 is a schematic diagram illustrating the elongation of a conceptual small cylindrical element of a fiber over an incremental period of time.

A corresponding change $d_y$, of axial position of the softened portion as the softening device 44 is swept over the cylindrical element being tapered can be determined by considering that the softening device 44 starts its motion at the leftmost side of the element as depicted in the upper portion of FIG. 5 and finishes its motion at the rightmost side of the element as depicted in the lower portion of FIG. 5. During the motion of the softening device 44, the element is being elongated. Therefore, the change in axial position of the softened portion, $d_y$, is equal to the initial length of the element plus half of the elongation, since the elongation is symmetrical about zero of the normalized coordinate system:

$$dy = dl_i + \frac{dx}{2} = \frac{dl_i + dl_f}{2} \qquad \text{Equation 6}$$

The differential quantity $dl_i$ can be can be transformed to a differential in the normalized coordinate system using Equation 2. Recognizing that the interval of $dz_i$ is $[-dl_i/2, dl_i/2]$, and solving for $dl_i$, we obtain:

$$dl_i = 2\frac{dz_i}{dz_n} \qquad \text{Equation 7}$$

Likewise, the differential quantity $dl_f$ can be transformed to the normalized coordinate system using Equation 3. Recognizing that the interval of $dz_f$ is $[-dl_f/2, dl_f/2]$, and solving for $dl_f$, we obtain:

$$dl_f = 2\frac{dz_f}{dz_n} \qquad \text{Equation 8}$$

Substituting into Equations 7 and 8 into Equation 5:

$$dx = 2\left(\frac{dz_f}{dz_n} - \frac{dz_i}{dz_n}\right) \qquad \text{Equation 9}$$

Integrating over $z_n$, elongation distance as a function of normalized axial location, $x(z_n)$, for any given initial elongation $x_0$, can be represented as:

$$x(z_n) = x_0 + 2\int_{-1}^{z_n}\left(\frac{dz_f}{dz_n'} - \frac{dz_i}{dz_n'}\right)dz_n' \qquad \text{Equation 10}$$

The corresponding axial position of the softened portion as a function of normalized axial location, for any given initial axial position $y_0$, can be similarly expressed as:

$$y(z_n) = y_0 + \int_{-1}^{z_n}\left(\frac{dz_f}{dz_n'} + \frac{dz_i}{dz_n'}\right)dz_n' \qquad \text{Equation 11}$$

The actual axial position of the softened portion can be expressed in terms of elongation as follows by inverting Equation 10 and substituting into Equation 11:

$$y(x) = y(z_n(x)) \qquad \text{Equation 12}$$

In accordance with a preferred embodiment of the invention, the instantaneous axial position of softening device 44, and thus, axial position of the softened portion is controlled by controller 36 so as to change along the z axis a distance $d_y$, at a repositioning speed, v, while the elongation distance increases along the z axis, by an amount $d_x$ at an elongation rate, u. For those two events to start and stop at the same time, the following ratio must be satisfied:

$$\frac{v}{u} = \frac{dy}{dx} \qquad \text{Equation 13}$$

The ratio of axial position of the softened portion to elongation distance can therefore be found by differentiating the axial position of the softened portion with respect to the elongation distance. A user will typically specify at least one control parameter such as repositioning speed or elongation rate based on considerations such as thickness of the fiber, to be tapered and any constraints imposed by such factors as the available heat output of the heat source or other softening device 44 being used, speed limitations of the particular apparatus being used, or the like. Once either repositioning speed or elongation rate is specified, the other one of those parameters is determinable based on Equation 13.

In view of the foregoing, it will be appreciated that the invention allows the elongation distance, elongation rate, axial position of the softened portion, and repositioning speed for each axial location all to be determined directly from the initial radial profile of the segment and the desired radial profile of the segment, both of which are known in advance. By carrying out softening and elongation in mutual coordination with one another with respect to axial location such that tapering is controlled consistent with corresponding elongation distances, elongation rates, axial positions of the softened portion, and repositioning speeds which substantially satisfy the relationships described by Equations 2, 3, 10, 11 and 13 above, an optical fiber segment can be tapered from one having a substantially arbitrary initial radial profile, to one which substantially conforms to a substantially arbitrary, pre-specifiable desired radial profile.

In order to carry out the method of the invention, and to implement the apparatus of the invention, programmable controller 36 is programmed to carry out mutually coordinated control of elongation distance, elongation rate, axial position of the softened portion, and repositioning speed as functions of axial position as described above.

In operation of the preferred embodiment of the apparatus illustrated in FIG. 1, the controller 36 is programmed to provide control signals to driver 33 to drive actuator 47 such that softening device 44 softens the segment at various successive axial locations such that the instantaneous axial position and speed of the softened portion are controlled according to the axial position and repositioning speed parameters as described above.

Controller 36 also provides control signals to driver 33 such that driver 33 drives stages 21 and/or 23 such that elongation of the segment is carried out in accordance in mutual coordination with the softening just described. More particularly, for the particular axial position at which the softened portion is located at a given time, the instantaneous relative mutual spacing, and instantaneous relative rate of travel, between stages 21 and 23 are controlled so as to provide the elongation distance and elongation rate which correspond to that particular axial position as described above.

Figure 6:
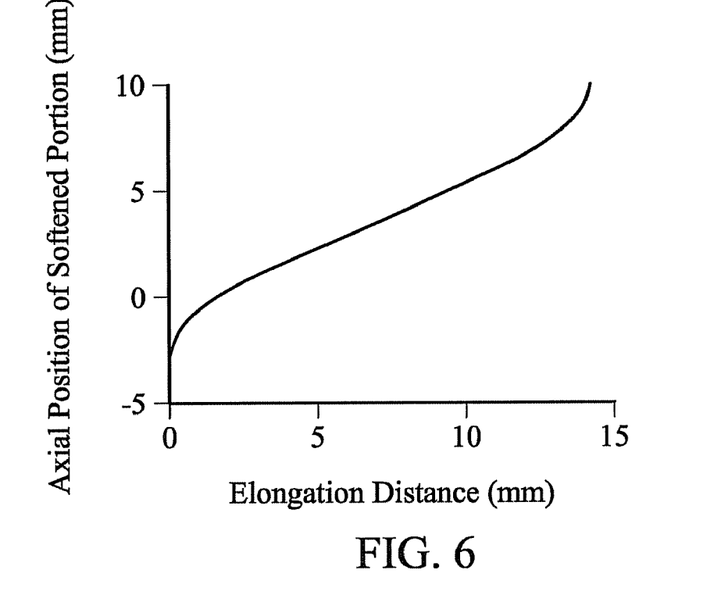
FIG. 6 is a graph illustrating a suitable relationship between axial position and elongation distance for tapering a segment of optical fiber from one having the initial radial profile of FIG. 2 into one which substantially conforms to the desired radial profile of FIG. 2 in accordance with the invention.
Figure 7:
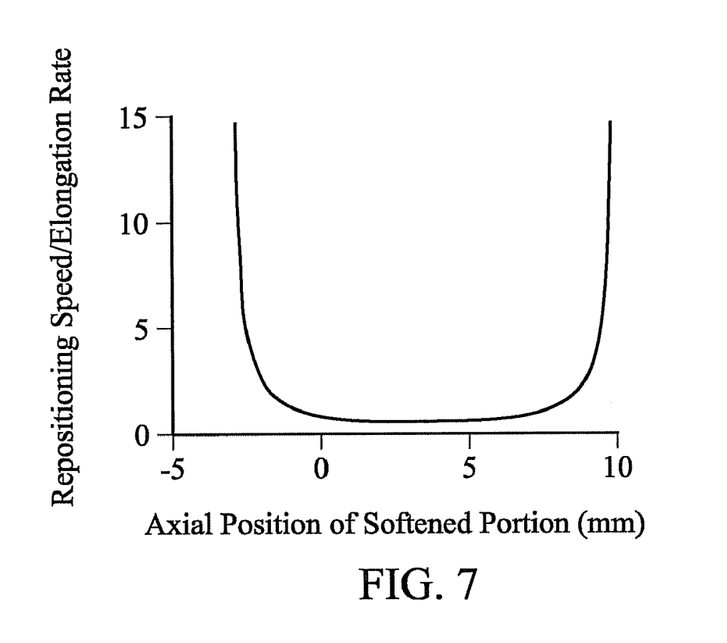
FIG. 7 is a graph illustrating a suitable relationship between the ratio of repositioning speed to elongation rate versus axial position of the softened portion for tapering a segment of optical fiber from one having the initial radial profile of FIG. 2 into one which substantially conforms to the desired radial profile of FIG. 2 in accordance with the invention.

A particular set of the aforementioned parameters operable for tapering an optical fiber segment of the particular initial radial profile shown in FIG. 2 into one which substantially conforms to the desired radial profile in the example shown in FIG. 2 is illustrated by FIGS. 6 and 7.

As will now be explained, a further aspect of the invention provides an apparatus and method for tapering to form fused optical fiber devices, such as optical couplers, having a desired profile.

In accordance with this aspect of the invention, tapered fused optical fiber devices are characterized by a particular cross-sectional area $A_x$, and a particular degree of fusion between two adjoining optical fibers. The degree of fusion can be expressed for example as a parameter ranging from zero (0) to one (1). A zero (0) degree of fusion refers to a case in which two adjoining fibers touch one another but are not fused. A degree of fusion of one (1) refers to fibers which are fully fused together and form a unitary, circular cross-section.

In accordance with this aspect of the invention, an effective radius, $r_{eff}$, can be defined as being at least substantially equal to the radius of a circular cross section whose area is at least substantially equal to the cross sectional area, $A_x$ of the fused coupler:

$$r_{eff} = \sqrt{\frac{A_x}{\pi}} \qquad \text{Equation 14}$$

The method of the invention is then carried out as otherwise described above except that a desired radius, $r_{eff}$ is specified as a desired effective radius consistent with Equation 14 above. If an increase in the degree of fusion is desired, the desired degree of fusion can be obtained by adjusting the degree to which the fibers are softened by the softening device 44 (i.e. the degree to which the fibers partially melt) or, by sweeping the heat source or other softening device 44, over the fibers, while not concurrently elongating them, until the desired degree of fusion is obtained. An apparatus according to this aspect of the invention can be provided by programming controller 36 to provide the operation just explained.

According to a further aspect of the invention, the initial radial profile is transformed iteratively into the ultimately desired radial profile by way of one or more intermediate radial profiles. Each intermediate radial profile preferably conforms more closely to the ultimate desired radial profile than does the radial profile of the segment which immediately precedes formation of a given intermediate radial profile. At least a particular axial portion of the segment is elongated and softened more than once and is permitted to harden into the intermediate profile before at least a portion of the intermediate profile itself is subjected to softening and elongation. The softening and elongation which immediately precede the hardening which results in the formation of the intermediate radial profile are carried out in accordance with the method of the invention as otherwise described above except that for, those particular softening and elongating steps, the intermediate radial profile is treated as the desired radial profile and the immediately preceding radial profile is treated as the initial radial profile. If desired, an intermediate radial profile can be softened, elongated and hardened into either a subsequent intermediate profile or into the ultimate profile or into the ultimate desired radial profile. As used herein, a portion of a segment is considered hardened when it is not in softened state as described above with respect to the characterization of a "softened portion."

The formation of one or more intermediate profiles can be useful in improving the degree to which the shape and dimensions of the completed tapered segment conform as closely as possible to the ultimate desired radial profile. This aspect of the invention is particularly useful in cases in which at least a portion of the ultimate desired radial profile exhibits one or more relatively abrupt changes in radius over a relatively short axial distance as compared to the initial radial profile.

It is to be recognized that in actual practice, a segment cannot be softened so as to create a softened portion of infinitesimally narrow axial length occupying only a single axial position point. Such is the case, regardless of whether only a single fiber or more than one fiber, are being tapered. Practical constraints imposed by such factors as the non-zero width of a the flame produced by a real softening device, the fact that softening does not take place truly instantaneously and the spreading of heat within a fiber due to internal thermal conduction will cause the softened portion to have at least a small axial length centered about some axial position. Such factors such as these will typically cause the final radial profile of the segment as actually tapered to deviate somewhat from the pre-specified desired radial profile. The amount of distortion tends to be more pronounced at regions where the radius of the desired radial profile changes abruptly over a relatively short axial distance. Adjusting the flame, or other softening device, such that the softened portion of the fiber is kept as short as possible in the axial direction, and keeping both ends of the softened portion as close as possible to a single theoretical axial point helps to improve the degree to which the shape and dimensions of a of fiber segment, as actually tapered, conforms to the pre-specified desired profile.

Notwithstanding practical limitations such as those mentioned above, the invention provides a method and apparatus useful for forming either single or fused fibers incorporating a tapered segment whose final actual radial profile substantially conforms closely to an unambiguously pre-specified desired radial profile. The invention further provides an apparatus and method capable of forming even radial profiles of relatively complex shape yet, can be pre-specified to exhibit smooth axial transitions in radius. The invention is both readily implemented, and capable of producing highly repeatable results.

The foregoing describes certain preferred and alternative embodiments of the present invention. It is to be understood that the invention is not limited to the particular embodiments described. In light of the present disclosure, various other embodiments will be apparent to persons skilled in the art. Accordingly, it is to be recognized that changes can be made without departing from the scope of the invention as particularly pointed out and distinctly claimed in the appended claims which are to be construed to encompass all legal equivalents thereof.

What is claimed is:

1. A method of tapering a segment of an optical fiber from one having an initial radial profile extending axially over an initial domain into one having a desired radial profile extending axially over a final domain, said method comprising the steps of:

softening the segment to form at least one softened portion, each said softened portion being located at a respective axial position;

elongating said at least one softened portion axially, and said softening step and said elongating step being controlled in accordance with at least one parameter determined based on a normalized axial coordinate reference by which points of the initial radial profile map to corresponding points of the desired radial profile, said normalized axial coordinate reference being an axial coordinate reference according to which the initial domain and the final domain are equal to one another.

2. A method as claimed in claim 1 wherein said softened portion is repositionable from at least one said axial position to another said axial position and said softened portion has a respective repositioning speed at each respective said axial position and wherein said elongating step comprises the step of elongating said softened portion, at a respective elongation rate and by a respective elongation distance, at each said respective said axial position and wherein said at least one parameter comprises a plurality of parameters and said axial position, said repositioning speed, said elongation rate and said elongation distance are each parameters which are included among said plurality of parameters.

3. A method as claimed in claim 2 wherein the value of at least one of said plurality of parameters is changed in a substantially stepwise, time-discrete manner during at least a portion of the time during which the method is carried out.

4. A method as claimed in claim 2 wherein the value of at least one of said plurality of parameters is changed in a substantially time-continuous manner during at least a portion of the time the method is being carried out.

5. A method as claimed in claim 1 wherein said softening step and said elongating step are carried out to successively form and elongate each of a plurality of said softened portions each said softened portion being located at a different respective said axial position, each respective one of said plurality of softened portions being formed and elongated at one of said axial positions before a different one of said softened portions is formed and elongated at a different one of said axial positions.

6. A method as claimed in claim 1 wherein said normalized axial coordinate reference is a coordinate reference by which said points of the initial radial profile map to said corresponding points of the desired radial profile according to a substantially isovolumetric relationship between the initial radial profile and the desired radial profile.

7. A method as claimed in claim 6 wherein said relationship can be expressed by an equation substantially of the form:

$$\int_{-1}^{z_n} r_i^2(z_n')\,dz_n' = \int_{z_{f1}}^{z_f} r_f^2(z_f')\,dz_f' \qquad \text{[Equation 3]}$$

where:
$z_n$ and $z_f$ represent the normalized axial domain and the actual domain of the desired radial profile, respectively;
$z_{f1}$ represents an axial endpoint of the desired radial profile;
$r_i$ represents the initial radial profile; and
$r_f$ represents the final radial profile.

8. A method as claimed in claim 7 further comprising the steps of forming the segment into a first intermediate radial profile which more closely conforms to the desired profile than does the initial radial profile conform to the desired radial profile.

9. A method as claimed in claim 8 further comprising the steps of softening and elongating the segment from said first intermediate radial profile into a subsequent radial profile.

10. A method as claimed in claim 9 wherein said subsequent radial profile comprises a second intermediate radial profile which conforms more closely to the desired radial profile than does said first intermediate radial profile conform to the desired radial profile.

11. A method as claimed in claim 9 wherein said subsequent radial profile substantially conforms to the desired radial profile.

12. A method of tapering an axial segment of a plurality of adjacent optical fibers which together have initial radial profile extending axially over an initial domain, to form a tapered, fused optical device having a desired radial profile extending axially over a final domain, said method comprising the steps of:

softening the segment to form at least one softened portion, each said softened portion being located at a respective axial position;

elongating said at least one softened portion axially, said softening step and said elongating step being controlled in accordance with at least one parameter determined based on a normalized axial coordinate reference by which points of the initial radial profile map to corresponding points of the desired radial profile, where said initial radial profile is specified by an initial effective radius and an initial degree of fusion and said desired radial profile is specified by a desired effective radius and a desired degree of fusion, said normalized axial coordinate reference being an axial coordinate reference according to which the initial domain and the final domain are equal to one another.

13. A method as claimed in claim 12 wherein said softened portion is repositionable from at least one said axial position to another said axial position and said softened portion has a respective repositioning speed at each respective said axial position and wherein said elongating step comprises the step of elongating said softened portion at a respective elongation rate and by a respective elongation distance at each respective said axial position and wherein said at least one parameter comprises a plurality of parameters and said axial position, said repositioning speed, said elongation rate and said elongation distance are each parameters which are included in said plurality of parameters.

14. A method as claimed in claim 13 wherein the value of at least one of said plurality of parameters is changed in a substantially stepwise, time-discrete manner during at least a portion of the time during which the method is carried out.

15. A method as claimed in claim 13 wherein the value of at least one of said plurality of parameters is changed in a substantially time-continuous manner during at least a portion of the time the method is being carried out.

16. A method as claimed in claim 12 wherein said softening step and said elongating step are carried out to successively form and elongate each of a plurality of said softened portions each said softened portion being located at a different respective said axial position, each respective one of said plurality of softened portions being formed and elongated at one said axial position before a different one of said softened portions is formed and elongated at a said different said axial position.

17. A method of tapering a segment of an optical fiber from one having an initial radial profile extending axially over an initial domain into one having a desired radial profile extending axially over a final domain, said method comprising the steps of:

- softening the segment to form a softened portion at an axial position whose time rate of change is a repositioning speed;
- elongating said softened portion axially by an elongation distance at an elongation rate; and
- controlling said axial distance, said repositioning speed, said elongation distance and said elongation rate in accordance with a relationship which can be expressed by:

$$x(z_n) = x_0 + 2\int_{-1}^{z_n}\left(\frac{dz_f}{dz_n'} - \frac{dz_i}{dz_n'}\right)dz_n'$$

and, $$y(z_n) = y_0 + \int_{-1}^{z_n}\left(\frac{dz_f}{dz_n'} + \frac{dz_i}{dz_n'}\right)dz_n'$$

and, $$y(x) = y(z_n(x))$$

and, $$\frac{v}{u} = \frac{dy}{dx}$$

where: $x(z_n)$ represents normalized axial location;
- $y(z_n)$ represents said axial position of said softened portion as a function of said normalized axial location;
- $y(x)$ represents the actual axial position of said softened portion;
- $x_0$ represents any initial said elongation distance;
- $y_0$ represents any initial said axial position of said softened portion;
- $z_i$ represents the actual domain of said initial radial profile of said segment;
- $z_f$ represents the actual domain of said desired radial profile of said segment;
- v represents said repositioning speed;
- u represents said elongation rate; and $$\frac{dy}{dx}$$

is a differential quantity which represents a rate of change of said actual axial position with respect to said elongation distance.

* * * * *